(12) United States Patent
Meng et al.

(10) Patent No.: US 10,976,595 B2
(45) Date of Patent: Apr. 13, 2021

(54) OPTICAL SUBSTRATE AND DISPLAY DEVICE

(71) Applicant: BOE TECHNOLOGY GROUP CO., LTD., Beijing (CN)

(72) Inventors: Xiandong Meng, Beijing (CN); Jifeng Tan, Beijing (CN); Wei Wang, Beijing (CN); Xianqin Meng, Beijing (CN); Fangzhou Wang, Beijing (CN); Qiuyu Ling, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/640,952

(22) PCT Filed: Sep. 25, 2019

(86) PCT No.: PCT/CN2019/107730
§ 371 (c)(1),
(2) Date: Feb. 21, 2020

(87) PCT Pub. No.: WO2020/088155
PCT Pub. Date: May 7, 2020

(65) Prior Publication Data
US 2020/0285104 A1    Sep. 10, 2020

(30) Foreign Application Priority Data

Oct. 30, 2018   (CN) .......................... 201811279913.6

(51) Int. Cl.
*G02F 1/1335*    (2006.01)
*F21V 8/00*      (2006.01)

(52) U.S. Cl.
CPC ....... *G02F 1/133524* (2013.01); *G02B 6/003* (2013.01); *G02B 6/0031* (2013.01); *G02B 6/0073* (2013.01)

(58) Field of Classification Search
CPC ... G02F 1/133526; G02F 2001/133622; G02F 1/133621; G02F 2001/134345;
(Continued)

(56) References Cited

U.S. PATENT DOCUMENTS

2009/0034230 A1    2/2009  Lim et al.
2009/0066880 A1*   3/2009  Sugita .................. G02B 6/0038
                                                      349/64

(Continued)

FOREIGN PATENT DOCUMENTS

CN    202947082 U    5/2013
CN    105301692 A    2/2016
(Continued)

OTHER PUBLICATIONS

Office Action of CN Application No. 201811279913.6 and English translation, dated May 7, 2020, 22 pages.
(Continued)

*Primary Examiner* — Michael H Caley
*Assistant Examiner* — Mariam Qureshi
(74) *Attorney, Agent, or Firm* — Muncy, Geissler, Olds & Lowe, P.C.

(57) ABSTRACT

The present disclosure provides an optical substrate and a display device. The optical substrate includes: a light guide plate which includes a light entering surface and a light extraction surface adjacent to the light entering surface, and is configured to enable light entering the light guide plate through the light entering surface to be totally reflected toward an opposite surface of the light guide plate opposite to the light entering surface; and a plurality of light extrac-
(Continued)

tion structures which is arranged on the light extraction surface of the light guide plate for extracting the totally-reflected light in the light guide plate, and has areas of orthogonal projections of the plurality of light extraction structures on the light extraction surface of the light guide plate gradually increasing along a direction from the light entering surface to the opposite surface.

18 Claims, 5 Drawing Sheets

(58) Field of Classification Search
  CPC ......... G02F 1/133615; G02F 1/133524; G02B 27/0955; G02B 6/0068; G02B 6/0055; G02B 6/0031; H01L 51/5275; F21V 17/00; F21V 2200/00; B29D 11/00663
  See application file for complete search history.

(56) References Cited

U.S. PATENT DOCUMENTS

| | | | | |
|---|---|---|---|---|
| 2009/0190072 A1* | 7/2009 | Nagata | ................ | G02B 6/0028 349/96 |
| 2013/0201424 A1* | 8/2013 | Uchida | ............ | G02F 1/133606 349/64 |
| 2016/0091775 A1* | 3/2016 | Gibson | ................ | G02B 30/00 349/186 |
| 2018/0188440 A1* | 7/2018 | Fattal | ...................... | G02B 1/12 |
| 2018/0196302 A1* | 7/2018 | Bae | .................. | G02F 1/133509 |
| 2020/0132907 A1 | 4/2020 | Tan | | |

FOREIGN PATENT DOCUMENTS

| | | |
|---|---|---|
| CN | 206074956 U | 4/2017 |
| CN | 107238974 A | 10/2017 |
| CN | 206757263 U | 12/2017 |
| CN | 107817629 A | 3/2018 |
| CN | 207123688 U | 3/2018 |
| CN | 108089253 A | 5/2018 |
| CN | 207882620 U | 9/2018 |
| CN | 108646493 A | 10/2018 |
| CN | 109061948 U | 12/2018 |
| JP | H11258604 A | 9/1999 |

OTHER PUBLICATIONS

International Search Report of PCT/CN2019/107730 and English translation, dated Nov. 27, 2019, 17 pages.

* cited by examiner

OPTICAL SUBSTRATE AND DISPLAY DEVICE

CROSS-REFERENCE TO RELATED APPLICATIONS

This application is the U.S. national phase of PCT Application No. PCT/CN2019/107730 filed on Sep. 25, 2019, which claims a priority to Chinese Patent Application No. 201811279913.6 filed on Oct. 30, 2018, the disclosures of which are incorporated in their entirety by reference herein.

TECHNICAL FIELD

The present disclosure relates to the field of display technology, and in particular to an optical substrate and a display device.

BACKGROUND

In the existing liquid crystal display device, a light ray emitted from a light source needs to pass through two polarizers. Therefore, the light transmittance is low and the power consumption is large.

SUMMARY

In one aspect, the present disclosure provides an optical substrate, including: a light guide plate which includes a light entering surface and a light extraction surface adjacent to the light entering surface, and is configured to enable light entering the light guide plate through the light entering surface to be totally reflected toward an opposite surface of the light guide plate opposite to the light entering surface; and a plurality of light extraction structures which is arranged on the light extraction surface of the light guide plate for extracting the totally-reflected light in the light guide plate, and has areas gradually increasing along a direction from the light entering surface to the opposite surface.

Optionally, the optical substrate further includes a plurality of beam condensing systems, in which the plurality of beam condensing systems corresponds to the positions of the plurality of light extraction structures and is each arranged at a side of the corresponding light extraction structure away from the light guide plate, and in which each of the plurality of beam condensing systems is configured to adjust a first light beam extracted by the corresponding light extraction structure to form a second light beam, an area of a region irradiated by the second light beam on a plane parallel to the light extraction surface is less than an area of a region irradiated by the corresponding first light beam on the plane parallel to the light extraction surface.

Optionally, the regions irradiated by the second light beams formed by the plurality of beam condensing systems on the plane parallel to the light extraction surface have an identical area.

Optionally, an orthogonal projection of each of the plurality of beam condensing systems on the light extraction surface completely covers an orthogonal projection of the corresponding light extraction structure on the light extraction surface.

Optionally, each of the plurality of beam condensing systems and the light extraction structures has a center of symmetry, and an orthogonal projection of the center of symmetry of each of the plurality of beam condensing systems on the light extraction surface overlaps an orthogonal projection of the center of symmetry of the corresponding light extraction structure on the light extraction surface.

Optionally, the plurality of beam condensing systems is a lens structure.

Optionally, each of the plurality of beam condensing systems includes a first lens and a second lens, the first lens is arranged on a surface of the second lens proximate to the light guide plate, a focal point of the first lens coincides with a focal point of the second lens, the first lens is configured to converge the first light beam to form a converged light, and the second lens is configured to adjust the converged light to form a second light beam emitted in parallel.

Optionally, the first lens is a convex lens, and the second lens is a convex lens or a concave lens.

Optionally, parameters of the first lenses in the plurality of beam condensing systems are configured to be not exactly identical, and parameters of the second lenses in the plurality of beam condensing systems are configured to be not exactly identical, so that the regions irradiated by the second light beams formed by the plurality of beam condensing systems on the plane parallel to the light extraction surface have an identical area.

Optionally, the optical substrate further includes a beam condensing system substrate arranged between the first lens and the second lens and configured to carry the first lens and the second lens.

Optionally, each light extraction structure is a light extraction grating configured to extract and diffract light transmitted in the light guide plate in a collimated manner, and grating characteristic parameters of the light extraction grating are identical.

Optionally, the plurality of light extraction structures is a plurality of light extraction gratings, and among the plurality of light extraction gratings, the light extraction grating having an area greater than a preset threshold is configured to converge light extracted by diffraction to form a third light beam.

Optionally, the light extraction grating having an area greater than a preset threshold includes at least two sub-gratings, and grating characteristic parameters of the at least two sub-gratings are configured to be not exactly identical, so that light extracted and diffracted by the at least two sub-gratings are converged to form a third light beam.

Optionally, the regions irradiated by the third light beams converged by the plurality of light extraction gratings on the plane parallel to the light extraction surface have an identical area.

Optionally, the optical substrate further includes a first planarization layer covering the light extraction structure and the light extraction surface of the light guide plate and having a refractive index less than a refractive index of the light guide plate.

In another aspect, the present disclosure further provides a display device including any one of the above optical substrate.

Optionally, the display device further includes a light source arranged at a side where a light entering surface of the light guide plate is located.

Optionally, the display device further includes a counter substrate, in which the counter substrate includes a black matrix configured to define a plurality of sub-pixel regions, each of the plurality of sub-pixel regions includes a light shielding region and opening regions arranged at both sides of the light shielding region, a light shielding pattern is arranged in the light shielding region, and the light shielding pattern are arranged at positions corresponding to the light extraction structure respectively.

Optionally, the an orthogonal projection of each light shielding pattern on the light extraction surface at least partially overlaps an orthogonal projection of the corresponding light extraction structure on the light extraction surface.

Optionally, the display device further includes: a light source, a counter substrate, and a liquid crystal layer arranged between the counter substrate and the optical substrate, in which the counter substrate includes a base substrate and a black matrix arranged on the base substrate and configured to define a plurality of sub-pixel regions, each of the plurality of sub-pixel regions includes a light shielding region and opening regions arranged at both sides of the light shielding region, and a light shielding pattern is arranged in the light shielding region, and in which the optical substrate further includes: a first planarization layer covering the light extraction structure and the light extraction surface of the light guide plate and having a refractive index less than a refractive index of the light guide plate; a plurality of beam condensing systems arranged on the first planarization layer and arranged at positions corresponding to the plurality of light extraction structures respectively, wherein each of the plurality of beam condensing systems is configured to adjust a first light beam extracted by the corresponding light extraction structure to form a second light beam, an area of a region irradiated by the second light beam on a plane parallel to the light extraction surface is less than an area of a region irradiated by the corresponding first light beam on a plane parallel to the light extraction surface; a second planarization layer covering the plurality of beam condensing systems and having a refractive index less than a refractive index of the light guide plate; a first electrode arranged on the second planarization layer; an insulating layer arranged on the first electrode; and a second electrode arranged on the insulating layer and configured to form an electric field together with the first electrode for driving the liquid crystal to deflect.

Optionally, the display device includes: a light source, a counter substrate, and a liquid crystal layer arranged between the counter substrate and the optical substrate; in which the counter substrate includes a base substrate, an upper electrode, and a black matrix arranged on the base substrate and configured to define a plurality of sub-pixel regions, each of the plurality of sub-pixel regions includes a light shielding region and opening regions arranged at both sides of the light shielding region, and a light shielding pattern is arranged in the light shielding region; in which the optical substrate further includes: a lower electrode configured to form an electric field together with the upper electrode for driving the liquid crystal to deflect; and dielectric gratings arranged at positions corresponding to the light extraction structures respectively and each filled with liquid crystals of the liquid crystal layer.

Optionally, the display device further includes: a light source, a counter substrate, and a liquid crystal layer arranged between the counter substrate and the optical substrate, in which the counter substrate includes a base substrate, an upper electrode, and a black matrix arranged on the base substrate and configured to define a plurality of sub-pixel regions, each of the plurality of sub-pixel regions includes a light shielding region and opening regions arranged at both sides of the light shielding region, and a light shielding pattern is arranged in the light shielding region; in which the optical substrate includes: a first planarization layer covering the light extraction structure and the light extraction surface of the light guide plate and having a refractive index less than a refractive index of the light guide plate; a plurality of beam condensing systems arranged on the first planarization layer and arranged at positions corresponding to the plurality of light extraction structures respectively, each of the plurality of beam condensing systems is configured to adjust a first light beam extracted by the corresponding light extraction structure to form a second light beam, an area of a region irradiated by the second light beam on a plane parallel to the light extraction surface is less than an area of a region irradiated by the corresponding first light beam on a plane parallel to the light extraction surface; a second planarization layer covering the plurality of beam condensing systems and having a refractive index less than a refractive index of the light guide plate; a lower electrode arranged on the second planarization layer and configured to form an electric field together with the upper electrode for driving the liquid crystal to deflect; and dielectric gratings arranged at positions corresponding to the light extraction structures respectively and each filled with liquid crystals of the liquid crystal layer.

DETAILED DESCRIPTION

Figure 1:
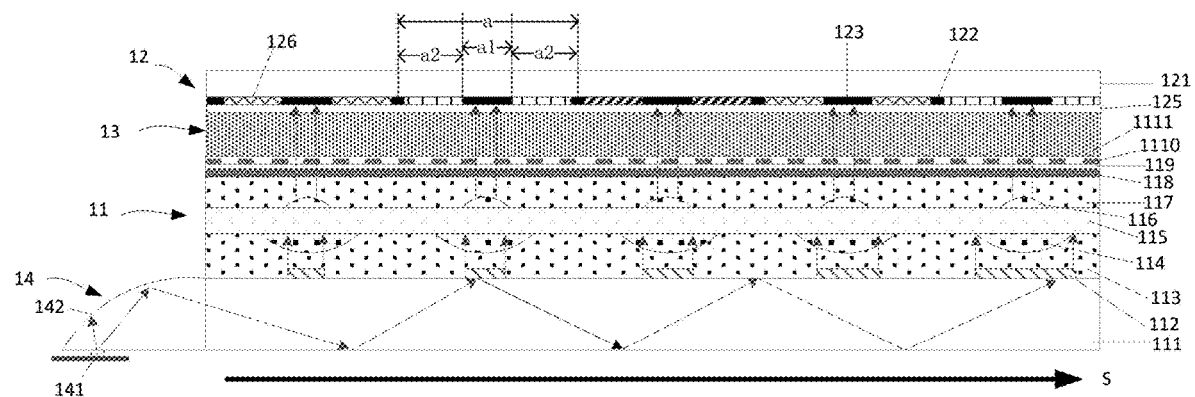
FIG. 1 is a schematic view showing the structure of a display device according to an embodiment of the present disclosure.

In order to illustrate the technical solutions in the embodiments of the present disclosure or the related art in a clearer manner, the embodiments of the present disclosure will be described hereinafter in conjunction with the drawings. Obviously, the embodiments described below are merely some optional embodiments of the present disclosure. Based on these optional embodiments, a person skilled in the art may obtain the other embodiments without any creative effort.

Embodiments of the present disclosure use a collimated light source display technology. In the collimated light source display technology, the light emitted by the light source enters the light guide plate, and is transmitted in total reflection in the light guide plate. A light extraction structure is arranged on the light guide plate, to extract the light transmitted in total reflection in the light guide plate in a collimated manner and project it to the liquid crystal layer. A light shielding pattern is correspondingly arranged at the position of the light extraction structure. When a driving electric field is not applied to the liquid crystal layer, the collimated light extracted by the light extraction structure is blocked by the light shielding pattern, thereby achieving a dark display. When a driving electric field is applied to the liquid crystal layer, the liquid crystal molecules are deflected, and the collimated light extracted by the light extraction structure is diffracted by the liquid crystal, and then is emitted from the opening regions on both sides of the light shielding pattern, thereby achieving a bright display. By applying different electric field signals to the liquid crystal layer, different diffraction efficiencies of the liquid crystal grating with respect to incident light can be achieved, thereby achieving a multi-grayscale display. Therefore, a display device using a collimated light source display technology does not need a polarizer to make light polarize, and has a large light transmittance and a low power consumption.

In the collimated light source technology, if the areas of the light extraction structures are identical, it will cause a change of the brightness of the backlight from large to small in the direction from the light entering surface of the light guide plate to the opposite surface, i.e., a problem of uneven backlight, thereby affecting the display effect.

Embodiments of the present disclosure provide an optical substrate and a display device including the optical substrate, which solve the problems of low light transmittance and large power consumption of the existing display device.

According to an embodiment of the present disclosure, provided is an optical substrate, including: a light guide plate which includes a light entering surface and a light extraction surface adjacent to the light entering surface, is configured to enable light entering the light guide plate through the light entering surface to be totally reflected toward an opposite surface of the light guide plate opposite to the light entering surface; and a plurality of light extraction structures which is arranged on the light extraction surface of the light guide plate for extracting the totally-reflected light in the light guide plate, and has areas of orthogonal projections of the plurality of light extraction structures on the light extraction surface of the light guide plate along a direction gradually increasing from the light entering surface to the opposite surface.

The above embodiments according to the present disclosure can produce the following advantageous technical effects.

In the above embodiment, the display device using a collimated light source display technology does not need a polarizer to make the light polarize, and has a high light transmittance and a low power consumption. In addition, the area of the light extraction structure is increasing along the direction from the light entering surface of the light guide plate to the opposite surface. That is, the farther away from the light source, the larger the area of the light extraction structure, the larger the area of the region irradiated by the extracted light, thereby compensating for the brightness loss of the light extracted by the light extraction structure far away from the light source, so that the brightness of the light extracted by each light extraction structure is basically constant, thereby improving the display effect.

The detailed description of the present disclosure will be further described in detail below with reference to the drawings and examples. The following examples are used to illustrate the detailed description of the disclosure, but are not intended to limit the scope of the disclosure.

FIG. 1 is a display device according to an embodiment of the present disclosure. The display device includes an optical substrate 11, a counter substrate (which may be a color filter substrate) 12, and a liquid crystal layer 13 arranged between the optical substrate 11 and the counter substrate 12.

The optical substrate 11 includes: a light guide plate 111 which includes a light entering surface and a light extraction surface adjacent to the light entering surface, and is configured to enable light entering the light guide plate 111 through the light entering surface to be totally reflected toward an opposite surface of the light guide plate 111 opposite to the light entering surface; and a plurality of light extraction structures 112 which is arranged on the light extraction surface of the light guide plate 111 for extracting the totally-reflected light in the light guide plate 111, and has areas of orthogonal projections of the plurality of light extraction structures on the light extraction surface of the light guide plate (area of an orthogonal projection of the plurality of light extraction structures 112 on the light guide plate 111) gradually increasing along a direction from the light entering surface to the opposite surface (the direction indicated by arrow S in FIG. 1). The so-called extraction means that the light propagating in the light guide plate 111 in a total reflection manner is emitted out from the light extraction surface of the light guide plate 111.

The counter substrate 12 includes a base substrate 121 and a black matrix 122. The black matrix is arranged on the base substrate 121. The black matrix 122 is configured to define a plurality of sub-pixel regions a. Each of the plurality of sub-pixel regions a includes a light shielding region a1 and opening areas a2 arranged on at sides of the light shielding region a1. A light shielding pattern 123 is arranged within the light shielding region a1, and the light shielding patterns 123 are arranged at positions corresponding to the light extraction structure 112 respectively. The so-called "correspond to . . . respectively" means that one light shielding pattern 123 corresponds to one light extraction structure 112, and the light shielding pattern 123 and the corresponding light extraction structure 112 also need to meet the following requirements in terms of position: the light shielding pattern 123 is capable of shielding the light extracted by the corresponding light extraction structure 112.

The working principle of the display device in the embodiment of the present disclosure is shown as follows. The light emitted by the light source enters the light guide plate 111 and is transmitted in a total reflection in the light guide plate 111. The light extraction structure 112 arranged on the light extraction surface of the light guide plate 111 extracts the light transmitted in a total reflection in the light guide plate 111 in a collimated manner (the so-called extract . . . in a collimated manner means that the extracted light is a collimated light), and projects it to the liquid crystal layer 13. When the driving electric field is not applied to the liquid crystal layer 13, the collimated light extracted by the light extraction structure 112 is blocked by the light shielding pattern 123, thereby achieving a dark display (that is, the screen is not displayed). When a driving electric field is applied to the liquid crystal layer 13, the liquid crystal molecules are deflected to form a liquid crystal grating, and the collimated light extracted by the light extraction structure 112 is diffracted by the liquid crystal, and then is emitted out from the opening regions a2 on both sides of the light shielding pattern 123, thereby achieving a bright display (that is, the screen is displayed). By applying different electric field signals to the liquid crystal layer 13, different diffraction efficiencies of the liquid crystal grating with respect to incident light can be achieved, thereby achieving a multi-grayscale display.

In the embodiment of the present disclosure, an area of an orthogonal projection of each light extraction structure 112 on the light extraction surface of the light guide plate is increasing along the direction from the light entering surface of the light guide plate 111 to the opposite surface, that is, the farther away from the light source, the larger the area of the light extraction structure 112, the larger the area of the region irradiated by the extracted light (the region irradiated by the extracted light refers to the area of a predetermined medium (e.g., a liquid crystal layer) irradiated by the light or a plane parallel to the light extraction surface irradiated by the light). Therefore, such light extraction structure setting may compensate for the brightness loss of the light extracted by the light extraction structure away from the light source 112, so that the brightness of the light extracted by each light extraction structure 112 is basically constant, thereby improving the display effect.

Optionally, the light guide plate 111 in the embodiment of the present disclosure is made of a transparent material, and has the characteristics of low haze, weak light absorption, and high surface parallelism.

Optionally, the black matrix 122 and the light shielding pattern 123 in the embodiment of the present disclosure may be made of the same material. Optionally, the black matrix 122 and the light shielding pattern 123 are formed by a single patterning process. Further optionally, a material for forming the black matrix 122 and the light shielding pattern 123 is a light absorbing material.

In an embodiment of the present disclosure, the display device includes a plurality of sub-pixel regions (i.e., a plurality of sub-pixel regions defined by the above mentioned black matrix) arranged in multiple rows and multiple columns. One light extraction structure 112 is arranged in each sub-pixel region. Optionally, the area of the light extraction structure 112 in the sub-pixel region is relatively small, thereby improving the aperture ratio. Optionally, the light guide plate 111 may be divided into a plurality of regions in a direction from the light entering surface of the light guide plate 111 to the opposite surface. Each region includes at least one column of light extraction structures 112, and the area of the at least one column of the light structures are identical. Optionally, each region includes one column of light extraction structures 112, so that the accuracy control of the brightness is more precise. In this structure, in the direction from the light entering surface of the light guide plate 111 to the opposite surface, the areas of the two adjacent columns of light extraction structures are different, and the area away from the light entering surface of the light extraction structure 112 is greater than the area proximate to the light entering surface of the light extraction structure 112.

In the embodiment of the present disclosure, since the area of the orthogonal projection area of the light extraction structure 112 on the light extraction surface of the light guide plate is increasing along the direction from the light entering surface of the light guide plate 111 to the opposite surface, so that the area of the region irradiated by the light extracted by the light extraction structure 112 is increasing along the direction from the light entering surface of the light guide plate 111 to the opposite surface. In some embodiments of the present disclosure, the area of the light shielding pattern 123 is increasing in the direction from the light entering surface of the light guide plate 111 to the opposite surface, so that when the dark state is achieved, the collimated light extracted by the light extraction structure 112 at the corresponding position is completely blocked, thereby avoiding light leakage.

It can be understood that, in a sub-pixel region, the increase in the area of the light shielding pattern 123 means the decrease in the opening region a2, thereby decreasing the overall transparency of the display device, and decreasing the overall display brightness.

In order to solve the above problems, the optical substrate 11 in the embodiment of the present disclosure may optionally include a plurality of beam condensing systems, in which the plurality of beam condensing systems are arranged at positions corresponding to the plurality of light extraction structures 112 respectively and arranged on a surface of the light extraction structure 112 away from the light guide plate 111, and in which each of the plurality of beam condensing systems is configured to adjust a first light beam extracted by the corresponding light extraction structure 112 to form a second light beam, and an area of a region irradiated by the second light beam on a plane parallel to the light extraction surface is less than an area of a region irradiated by the corresponding first light beam on a plane parallel to the light extraction surface. The so-called "corresponding to respectively" means that the orthogonal projection of the beam condensing system on the light extraction surface at least partially overlaps the orthogonal projection of the light extraction structure 112 on the light extraction surface of the light guide plate. Optionally, the central positions of the beam condensing system and the light extraction structure 112 corresponding in one-to-one manner are aligned in one-to-one manner. Optionally, each of the plurality of beam condensing systems and the light extraction structures has a center of symmetry, and an orthogonal projection of the center of symmetry of each of the plurality of beam condensing systems on the light extraction surface completely overlaps an orthogonal projection of the center of symmetry of the corresponding light extraction structure on the light extraction surface.

In the embodiment of the present disclosure, the irradiation area of the light extracted by the light extraction structure 112 may be reduced by setting a beam condensing system on the light extraction surface of the light extraction structure 112, thereby ensuring that the area of the light irradiated on each light shielding pattern 123 is basically identical. Further, such arrangement may ensure that the area of the light shielding pattern 123 does not increase due to the increase in the area of the light extraction structure 112, thereby improving the aperture ratio.

In the embodiment of the present disclosure, the areas of the plane parallel to the light extraction surface irradiated by the second light beams formed by the beam condensing system are identical, so that each light shielding pattern 123 has an identical area, and each sub-pixel region has an identical size of the opening region.

In an embodiment of the present disclosure, the plurality of beam condensing systems is a lens structure. The lens structure ensures transparency and brightness while achieving beam condensing. In some embodiments of the present disclosure, it is not excluded that the beam condensing system is a structure other than a lens structure, as long as the purpose of reducing the area irradiated by the light extracted by the light extraction structure 112 can be achieved.

Figure 2:
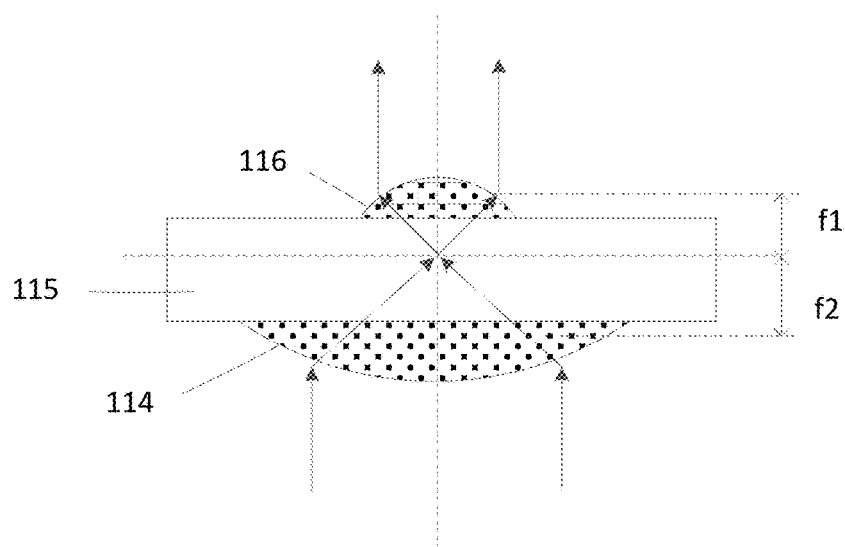
FIG. 2 is an enlarged schematic view showing the structure of a beam condensing system in a display device according to an embodiment of the present disclosure.

Please refer to FIGS. 1 and 2. In the embodiments shown in FIGS. 1 and 2, each of the plurality of beam condensing systems includes a first lens 114 and a second lens 116, the first lens 114 is arranged on a surface of the second lens 116 proximate to the light guide plate 111, and a focal point of the first lens 114 coincides with a focal point of the second lens 116. Further referring to FIG. 2, in the case that the light incident on the first lens is parallel light, the coincidence of the focal points may allow the light emitted from the second lens to still be parallel light. Optionally, the first lens 114 is configured to converge the first light beam to form a converged light, and the second lens 116 is configured to adjust the converged light to form a second light beam emitted in parallel.

In the embodiment of the present disclosure, the optical substrate 11 may further include a beam condensing system substrate 115 arranged between the first lens 114 and the second lens 116 and configured to carry the first lens 114 and the second lens 116.

In the embodiment shown in FIGS. 1 and 2, the first lens 114 and the second lens 116 are both convex lenses, in which the size of the first lens 114 is greater than the size of the second lens 116, the planes of the lens 114 and the second lens 116 are both arranged on the beam condensing system substrate 115, and the convex surface of the first lens 114 faces the light guide plate and the convex surface of the second lens 116 faces the liquid crystal layer. Optionally, the focal length of the first lens 114 is f2, and the focal length of the second lens 116 is f1, in which f1 is less than f2. Therefore, the beam condensing ratio obtained by the lens structure composed of the first lens 114 and the second lens 116 is: f2/f1. As shown in FIG. 2, according to the similar triangle principle, the ratio of the area irradiated by the incident light to the area irradiated by the emitted light is f2/f1.

Figure 3:
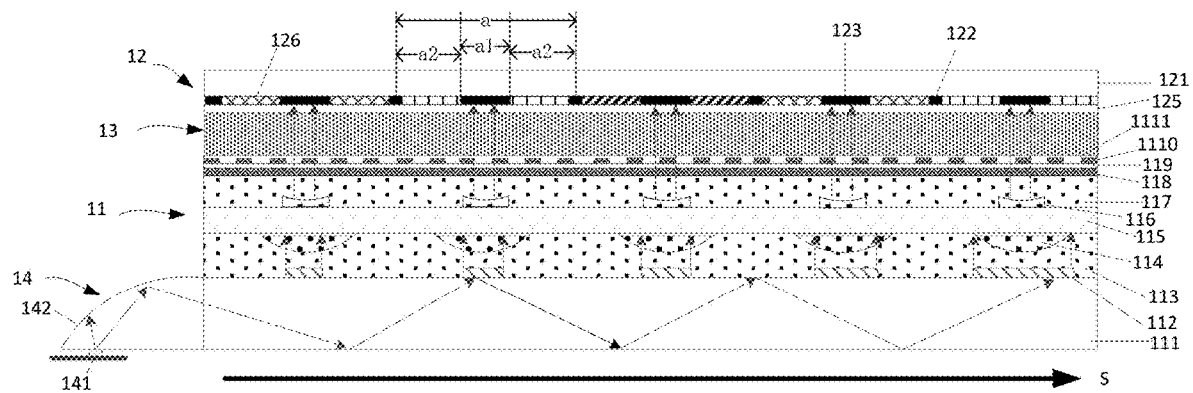
FIG. 3 is a schematic view showing the structure of a display device according to another embodiment of the present disclosure.
Figure 4:
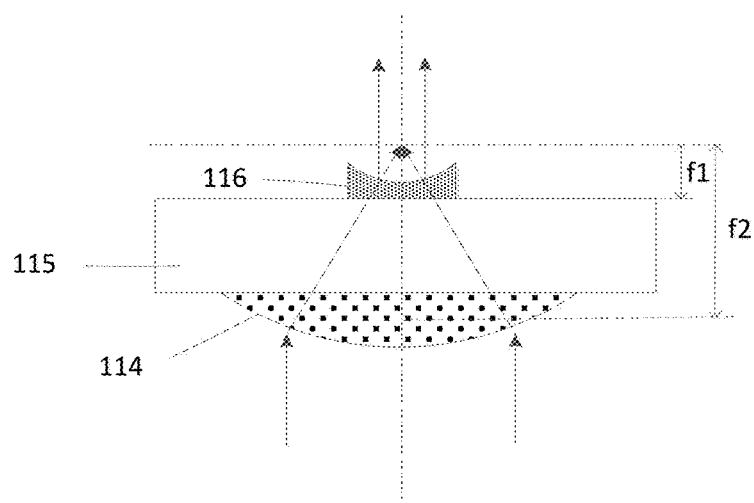
FIG. 4 is an enlarged schematic view showing the structure of a beam condensing system in a display device according to another embodiment of the present disclosure.

Of course, the types of the first lens 114 and the second lens 116 are not limited to this. In some embodiments of the present disclosure, the first lens 114 is a convex lens and the second lens 116 is a concave lens. The size of the first lens 114 is greater than the size of the second lens 116, the planes of the first lens 114 and the second lens 116 are both arranged on the beam condensing system substrate 115, the convex surface of the first lens 114 faces the light guide plate, and the concave surface of the second lens 116 faces the liquid crystal layer, as shown in FIGS. 3 and 4. Optionally, the focal length of the first lens 114 is f2, and the focal length of the second lens 116 is f1, in which f1 is less than f2. Therefore, the beam condensing ratio obtained by the lens structure composed of the first lens 114 and the second lens 116 is: f2/f1. As shown in FIG. 4, according to the similar triangle principle, the ratio of the area irradiated by the incident light to the area irradiated by the exited light is f2/f1.

In some embodiments of the present disclosure, the lens structure is not limited to including two lens elements, and may include more, for example, 4, 6, or 8, lens elements. Optionally, the types of lens elements are not limited to a convex lens and a concave lens.

In some embodiments of the present disclosure, the parameters (for example, focal lengths, diameters or maximum length of lens plane, etc.) of the first lenses and the second lenses in the plurality of beam condensing systems are configured such that the regions irradiated by the second light beams formed by the plurality of beam condensing systems on the plane parallel to the light extraction surface have an identical area. For example, in each of the plurality of beam condensing systems, the parameters (for example, the focal length, the diameter or the maximum length of the lens plane, etc.) of the first lens 114 is not exactly identical, and the parameters (for example, the focal length, the diameter or maximum length of the lens plane, etc.) of the second lens 116 is not exactly identical, so that the regions irradiated by the second light beams formed by the plurality of beam condensing systems on the plane parallel to the light extraction surface have an identical area. Therefore, this can allow each light shielding pattern 123 to have the same area, and each sub-pixel region has the same size of the opening region.

In some embodiments of the present disclosure, the parameters of the first lens 114 in each of the plurality of beam condensing systems may be identical, and parameters of the second lens 116 may also be identical. Even if such setting cannot achieve that the regions irradiated by the second light beams formed by the plurality of beam condensing systems on the plane parallel to the light extraction surface have an identical area, it can still allow that the area of the region on a plane parallel to the light extraction surface irradiated by the second light beam is less than the area of the region on a plane parallel to the light extraction surface irradiated by the first light beam extracted by the corresponding light extraction structure, thereby reducing the area of the light shielding pattern 123. Moreover, since the parameters of the first lenses 114 and the second lenses 116 in the plurality of beam condensing systems are identical, the manufacturing process is relatively simple. In some optional embodiments of the present disclosure, a plurality of beam condensing systems having the same parameters can be obtained directly by the nano-imprint method.

In the embodiment of the present disclosure, the light extraction structure may be a light extraction grating, and the light extraction grating may be a micro/nano structure for extracting and diffracting the light transmitted in the light guide plate in a collimated manner. The so-called extracting and diffracting . . . in a collimated manner means that the light transmitted in the light guide plate is diffracted and extracted, and the extracted light is a collimated ray. Optionally, the grating characteristic parameters of the light extraction gratings are identical. The grating characteristic parameters refer to the parameters related to a grating characteristic, for example, including a period, a duty ratio and/or a groove depth. Here, the area does not belong to the grating characteristic parameters.

In the embodiment of the present disclosure, the material of which the light extraction grating is made is required to be a material having a relative high refractive index. For example, SiNx (refractive index is 1.8 to 2.0) may be selected.

In the embodiment of the present disclosure, the period of the light extraction grating can be calculated according to the following equation:

$$n1 \sin \theta_1 - n2 \sin \theta_2 = m\lambda/P.$$

in which n1 is the refractive index of the medium in which the incident light wave is located; n2 is the refractive index of the medium in which the diffracted light wave is located; θ1 is the incident angle; θ2 is the diffraction angle; m is the diffraction order, which is generally +1 or −1; λ is the wavelength of the light wave; and P is the period of the grating.

The grating characteristic parameters, such as the period, duty cycle, and/or groove depth, of the light extraction grating determine the diffraction efficiency of the light extraction grating, and the specific grating characteristic parameters can be obtained by the optimized design according to optical optimization design software (e.g., lightools, zemax, etc.).

In the embodiment of the present disclosure, the light extraction grating is located on the upper surface of the light guide plate, and a plurality of light extraction gratings are arranged at intervals, in which one light extraction grating is arranged in one sub-pixel region. In order to ensure uniform backlight, the area of the light extraction grating is increasing along the direction from the light entering surface of the light guide plate to the opposite surface. The determination of the specific area parameters can be obtained by optimization according to the optical optimization design software based on the specific size specifications.

In an optional embodiment, the length of the light guide plate is 200 mm and the size of the sub-pixel region is 254 μm×254 μm in the direction (length direction) from the light entering surface of the light guide plate to the opposite surface. In the sub-pixel region, the width of the light extraction grating is always equal to 254 In the length direction, the length of the light extraction grating is changed to achieve a uniform backlight, as shown in FIG. 5.

Figure 5:
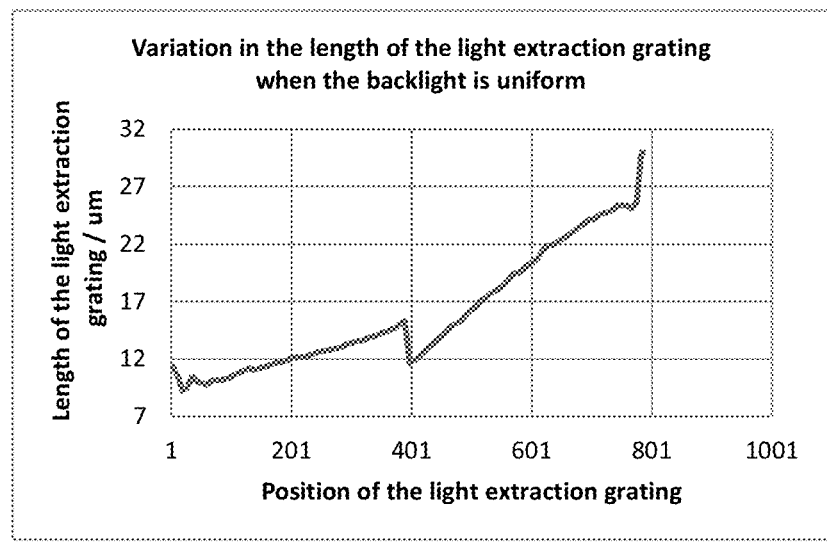
FIG. 5 is a schematic view showing a relationship between a position of a light extraction grating and a length of the light extraction grating according to an embodiment of the present disclosure.

FIG. 5 is a schematic view showing the relationship between the length and position of the light extraction grating when the backlight is uniform. The abscissa is the position of the light extraction grating (from the light entering surface of the light guide plate to the opposite surface, and the order of the light extraction grating is 1, 2 or 3), and the ordinate is the length of the light extraction grating.

Figure 6:
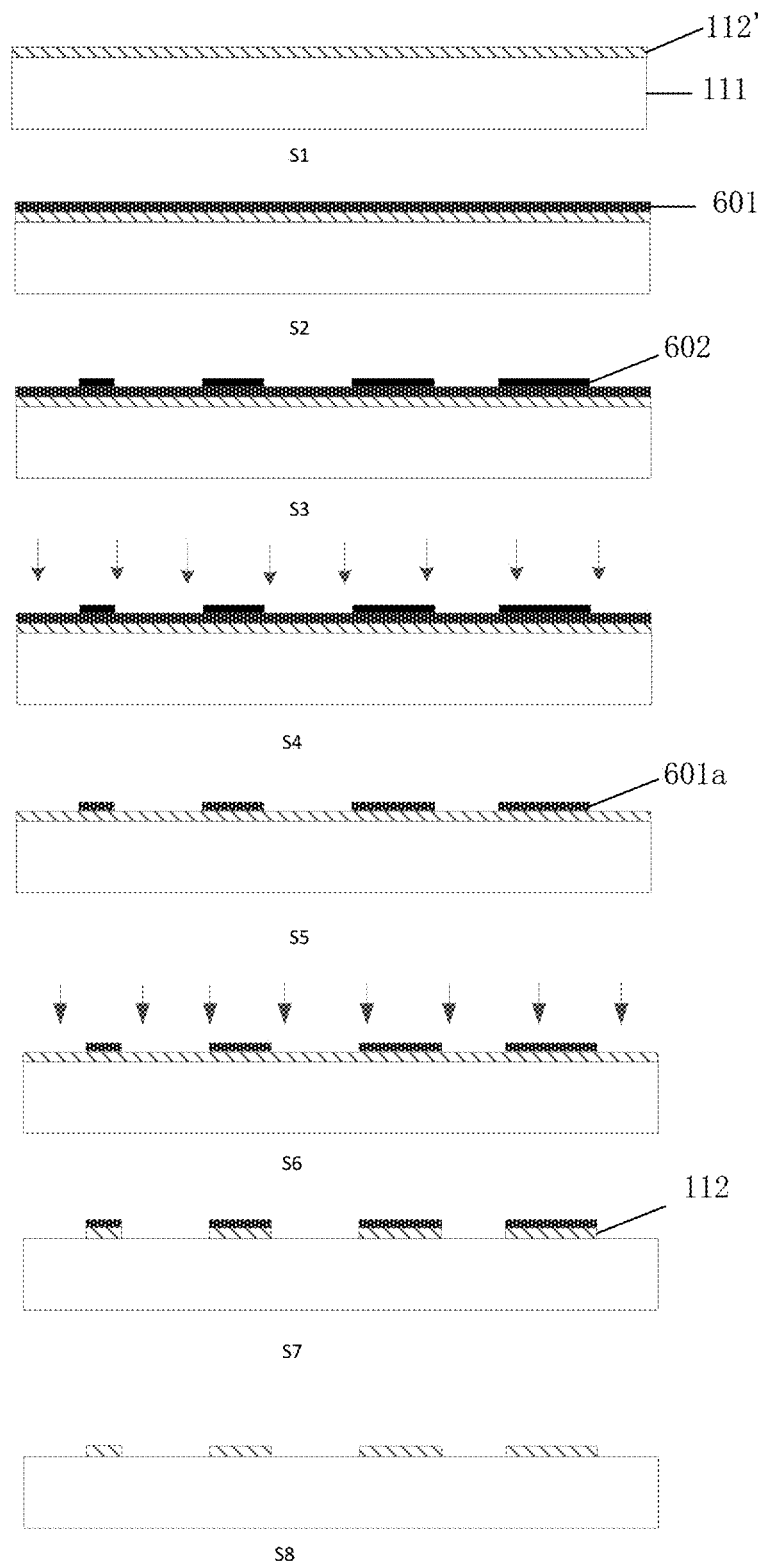
FIG. 6 is a schematic view showing a method for preparing a light extraction grating according to an embodiment of the present disclosure.

In the embodiment of the present disclosure, since the grating characteristic parameters of the light extraction gratings are identical, in the manufacturing process, only one layer of grating structure having the same grating characteristic parameters and one layer of mask for exposure are needed. Thus the process is easy to implement. FIG. 6 is a schematic view showing a method for preparing a light extraction grating according to an embodiment of the present disclosure. The method includes the following steps:

Step S1: forming a layer of grating structure 112' having the same grating characteristic parameter on the light guide plate 111;

Step S2: coating a photoresist (PR resist) 601 on the grating structure 112';

Step S3: providing a mask plate 602;

Step S4: exposing the photoresist 601 by the mask plate 602;

Step S5: developing a photoresist pattern 601a;

Step S6: etching the grating structure 112';

Step S7: forming a light extraction grating 112; and

Step S8: stripping the photoresist pattern 601a.

In the embodiment of the present disclosure, the light extraction grating may be of other types, which will be exemplified below.

In some embodiments of the present disclosure, the plurality of light extraction structures is a plurality of light extraction gratings. Among the plurality of light extraction gratings, the light extraction gratings having an area greater than a set threshold (for example, starting from one side of the light guide plate proximate to the light entering surface, except for the first light beam extraction grating, all other light extraction gratings are light extraction gratings having an area greater than a preset threshold, in which the preset threshold is the area of the first light beam extraction grating) converge the diffracted and extracted light to form a third light beam.

Optionally, the regions irradiated by the third light beams converged by the plurality of light extraction gratings have an identical area.

Figure 7:
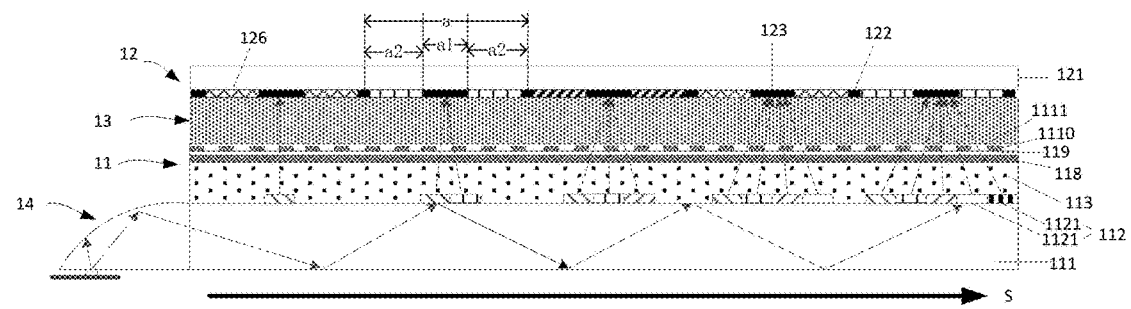
FIG. 7 is a schematic view showing the structure of a display device according to still another embodiment of the present disclosure.
Figure 8:
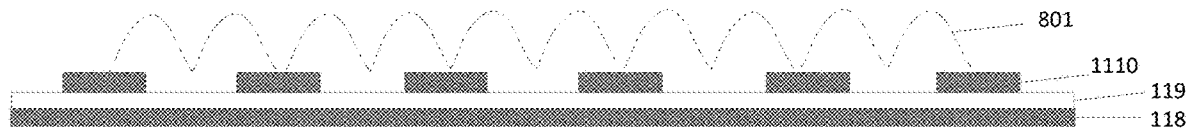
FIG. 8 is a schematic view showing a driving electrode according to an embodiment of the present disclosure.

FIG. 7 is a schematic view showing the structure of a display device according to another embodiment of the present disclosure. In this embodiment, the light extraction structure is a light extraction grating. Among a plurality of light extraction gratings, the light extraction grating having an area greater than a preset threshold (for example, starting from the side of the light guide plate proximate to the light entering surface, except for the first light beam extraction grating, all other light extraction gratings are light extraction gratings having an area greater than a preset threshold, which is the area of the first light beam extraction grating) includes at least two sub-gratings 1121, and the grating characteristic parameters of the at least two sub-gratings 1121 are not exactly identical, so that light extracted and diffracted by the at least two sub-gratings 1121 are converged to form a third light beam. Optionally, the area of the irradiation region of the third light beam is less than or equal to the area of the light shielding pattern 123 at a corresponding position, so that the third light beam can be completely blocked by the light shielding pattern 123 in a dark state.

In the embodiment of the present disclosure, in the direction from the light entering surface of the light guide plate to the opposite surface, the more the number of sub-gratings of the light extraction grating, the larger the area irradiated by the extracted light. The light extraction grating having a plurality of sub-gratings converges the extracted light to the center of the light shielding pattern 123 in a converging manner, so that adjusting the area of the light extraction grating may not only achieve uniform backlight, but also basically does not need to change the size of the upper light shielding pattern, thereby ensuring the transparency and brightness of the overall display device, and without the need to increase the beam condensing system, and thus the thickness is relatively low.

In the embodiment of the present disclosure, the area of the region irradiated by the third light beam, which is converged by each light extraction grating, is identical, so that the sizes of the upper light shielding patterns can be identical. This is beneficial to display uniformity.

Optionally, the light extraction grating for achieving the convergence effect includes at least two sub-gratings. Optionally, the light extraction grating for achieving the convergence effect may be a single grating, which has relatively complicated grating characteristic parameters inside. It may also achieve the convergence effect.

In the embodiments shown in FIGS. 1, 3 and 7, the optical substrate 11 may further include a first planarization layer 113 which covers the light extraction structure 112 and the light extraction surface of the light guide plate 111 and is configured to make the light extraction structure 112 planarize. Optionally, the refractive index of the first planarization layer 113 is less than the refractive index of the light guide plate 111, to ensure that the total reflection angle in the light guide plate 111 is relatively large. Optionally, the first planarization layer 113 may be made of a material such as resin.

In the embodiment shown in FIGS. 1 and 3, the optical substrate 11 may further include a second planarization layer 117 which covers the beam condensing system and is configured to make the beam condensing system planarize. Optionally, the second planarization layer 117 may be made of a material such as resin.

In the embodiments of FIGS. 1, 3, 7 and 8, the optical substrate 11 may further include: a first electrode 118 and a second electrode 1110, in which the first electrode 118 and the second electrode 1110 are configured to generate a driving electric field 801 for driving the polarization of the liquid crystal molecules in the liquid crystal layer. Optionally, one of the first electrode 118 and the second electrode 1110 is a pixel electrode, and the other is a common electrode. Optionally, at least one of the first electrode 118 and the second electrode 1110 is a slit electrode. Optionally, the optical substrate 11 further includes: an insulating layer 119 located between the first electrode 118 and the second electrode 1110.

In the embodiments shown in FIGS. 1, 3, 7 and 8, the first electrode 118 is a planar electrode, the second electrode 1110 is a slit electrode, and the second electrode 1110 is located on a side of the first electrode 118 proximate to the liquid crystal layer 13. Of course, in other embodiments of the present disclosure, the positions of the first electrode 118 and the second electrode 1110 may also be interchanged.

In the above embodiments, the driving electrodes (the first electrode 118 and the second electrode 1110) are in the form of ADS, and the purpose thereof is to use the fringing field effect to form a liquid crystal grating. In this embodiment, the liquid crystal needs to satisfy that $\Delta n = n_e - n_o$ ($n_e$ is the e-refractive index of the liquid crystal, and $n_o$ is the o-refractive index of the liquid crystal) is as large as possible, so that the diffraction efficiency of the liquid crystal grating is high.

In the embodiment of the present disclosure, in the case that a display is needed, when a certain voltage signal is applied to the above-mentioned first electrode 118 and second electrode 1110, the liquid crystal is driven to present a liquid crystal grating arranged periodically. At this time, the collimated light emitted from the light guide plate 111 is diffracted and refracted by the liquid crystal grating and then emitted out from the opening regions on both sides of the light shielding pattern 123. When gray scale is need to be displayed, the diffraction efficiency of the liquid crystal grating for incident ray can be made different by controlling the size of the voltage signal, thereby achieving a gray scale between L0 and L255.

The driving electrodes in the above embodiments may be in the form of ADS. Of course, the present disclosure is not limited to this, and the driving electrode may also be a twisted nematic (TN) or electrical control birefringence (ECB) form, which will be described below.

Figure 9:
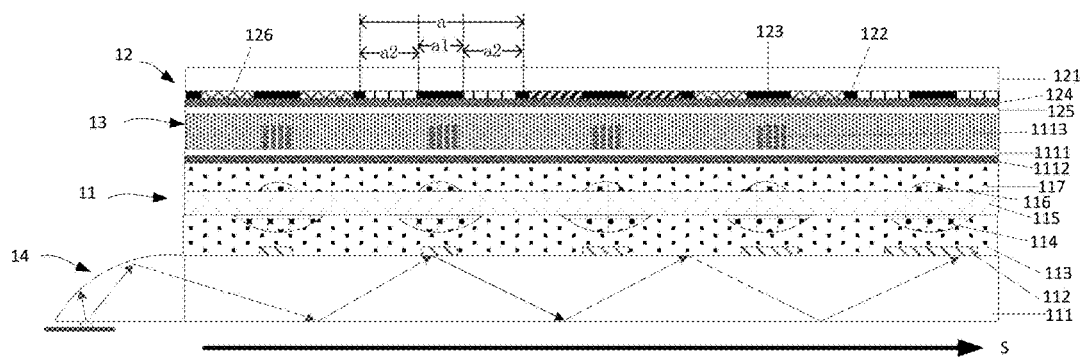
FIG. 9 is a schematic view showing the structure of a display device according to still another embodiment of the present disclosure.

In the embodiment shown in FIG. 9, the optical substrate 11 includes a lower electrode 1112, the counter substrate 12 includes an upper electrode 124, while the optical substrate 11 further includes a plurality of dielectric gratings 1113. A dielectric grating 1113 is arranged in each sub-pixel region. Liquid crystal is filled in the dielectric grating 1113. The dielectric grating 1113 and the liquid crystal together form a composite grating. The deflection state of the liquid crystal is modulated by applying voltage to the upper electrode 124 and the lower electrode 1112. When the refractive index of the dielectric grating and the refractive index of the liquid crystal are identical, the composite grating has no diffraction effect, and the light is absorbed by the light shielding pattern 123. When there is a difference between the equivalent refractive index of the liquid crystal and the equivalent refractive index of the dielectric grating, the composite grating plays a diffractive role and deviates the light from the light shielding pattern 123, thereby forming a bright state. The diffraction efficiency of the composite grating can reach 50% or more, which is much higher than that of a simple liquid crystal grating, thereby improving the liquid crystal light efficiency.

In the embodiments of the present disclosure, the dielectric grating may be made of a metal or the like.

In the above embodiments of the present disclosure, the optical substrate 11 may further include a first alignment layer 1111, and the counter substrate 12 further includes a second alignment layer 125 for aligning the liquid crystal layer 13.

In the above embodiments of the present disclosure, the counter substrate 12 may further include a filter pattern 126 arranged in the opening region a2, thereby achieving color display. In some embodiments of the present disclosure, the filter pattern 126 may include a red filter pattern, a green filter pattern and a blue filter pattern. In other embodiments of the present disclosure, the filter pattern 126 may also be a quantum dot filter pattern.

In an embodiment of the present disclosure, the display device may further include a light source 14 for generating a backlight incident into the light guide plate.

In some embodiments of the present disclosure, as shown in FIGS. 1 and 3, the light source 14 may include an LED 141 and a free-form surface reflector 142 covering the LED 141. The LED 141 may generally be an inorganic semiconductor chip (including a Micro-LED chip), or may be an OLED. The color of the emitted light may be monochromatic, and its spectral half-peak width is required to be narrow. The function of the free-form surface reflector 142 is to collimate the light emitted by the LED 141 at a certain central angle to be coupled into a light guide plate for total reflection transmission. The surface shape of the free-form reflecting cover 142 may be selected from a rotating paraboloid structure.

The optical substrate 11 in the embodiment of the present disclosure may be a display substrate. Optionally, a base substrate of the display substrate is the light guide plate 111, and the components on the optical substrate 11 are all located on the display substrate. At this time, the backlight module of the display device only needs to be provided with the light source 14.

In other embodiments of the present disclosure, the optical substrate 11 may be a backlight module. Optionally, the backlight module may include the above-mentioned light guide plate 111 and light extraction structure 112. The display device may further include a display substrate. The display substrate includes a base substrate. The driving electrodes and the like may be located on the base substrate of the display substrate. The beam condensing system may be located on the backlight module or may be located on the base substrate of the display substrate.

The display device in the embodiment of the present disclosure may be a collimated light source display device, an AR/VR display device, a transparent display device, or a directional display device.

The above descriptions are merely optional embodiments of the present disclosure. It should be noted that one skilled in the art would make several improvements and substitutions without departing from the principles of the present disclosure. These improvements and modifications should also be regarded as the protection scope of the present disclosure.

What is claimed is:
1. An optical substrate, comprising:
   a light guide plate which comprises a light entering surface and a light extraction surface adjacent to the light entering surface, and is configured to enable light entering the light guide plate through the light entering surface to be totally reflected toward an opposite surface of the light guide plate opposite to the light entering surface;

a plurality of light extraction structures which is arranged on the light extraction surface of the light guide plate for extracting the totally-reflected light in the light guide plate, and has areas gradually increasing along a direction from the light entering surface to the opposite surface;

a first planarizaton layer covering the light extraction structure and the light extraction surface of the light guide plate and having a refractive index less than a refractive index of the light guide plate;

a plurality of beam condensing systems arranged on the first planarization layer and arranged at positions corresponding to the plurality of light extraction structures respectively, wherein each of the plurality of beam condensing systems is configured to adjust a first light beam extracted by a corresponding light extraction structure to form a second light beam, an area of a region irradiated by the second light beam on a plane parallel to the light extraction surface is less than an area of a region irradiated by the corresponding first light beam on a plane parallel to the light extraction surface; and a second planarization layer covering the plurality of beam condensing systems and having a refractive index less than a refractive index of the light guide plate.

2. The optical substrate of claim 1, wherein the regions irradiated by the second light beam formed by the plurality of beam condensing systems on the plane parallel to the light extraction surface have identical area.

3. The optical substrate of claim 1, wherein an orthogonal projection of each of the plurality of beam condensing systems on the light extraction surface completely covers an orthogonal projection of the corresponding light extraction structure on the light extraction surface.

4. The optical substrate of claim 1, wherein each of the plurality of beam condensing systems and the light extraction structure has a center of symmetry, and an orthogonal projection of the center of symmetry of each of the plurality of beam condensing systems on the light extraction surface overlaps an orthogonal projection of the center of symmetry of the corresponding light extraction structure on the light extraction surface.

5. The optical substrate of claim 1, wherein each of the plurality of beam condensing systems is a lens structure.

6. The optical substrate of claim 5, wherein each of the plurality of beam condensing systems comprises a first lens and a second lens, the first lens is arranged at a side of the second lens proximate to the light guide plate, a focal point of the first lens coincides with a focal point of the second lens, the first lens is configured to converge the first light beam to form a converged light beam, and the second lens is configured to adjust the converged light beam to form a second light beam exiting in parallel.

7. The optical substrate of claim 6, wherein the first lens is a convex lens, and the second lens is a convex lens or a concave lens.

8. The optical substrate of claim 6, wherein parameters of the first lenses in the plurality of beam condensing systems are configured to be not exactly identical, and parameters of the second lenses in the plurality of beam condensing systems are configured to be not exactly identical, so that the regions irradiated by the second light beams formed by the plurality of beam condensing systems on the plane parallel to the light extraction surface have identical area.

9. The optical substrate of claim 6, wherein the optical substrate further comprises a beam condensing system substrate arranged between the first lens and the second lens and configured to carry the first lens and the second lens.

10. The optical substrate of claim 1, wherein each light extraction structure is a light extraction grating configured to extract and diffract light transmitted in the light guide plate in a collimated manner, and grating characteristic parameters of the light extraction grating are identical.

11. The optical substrate of claim 1, wherein the plurality of light extraction structures is a plurality of light extraction gratings; and among the plurality of light extraction gratings, the light extraction grating having an area greater than a preset threshold is configured to converge light extracted by diffraction to form a third light beam.

12. The optical substrate of claim 11, wherein the light extraction grating having an area greater than the preset threshold comprises at least two sub-gratings, and grating characteristic parameters of the at least two sub-gratings are configured to be not exactly identical, so that light extracted and diffracted by the at least two sub-gratings are converged to form a third light beam.

13. The optical substrate of claim 11, wherein the regions irradiated by the third light beams converged by the plurality of light extraction gratings on the plane parallel to the light extraction surface have an identical area.

14. A display device, comprising the optical substrate of claim 1.

15. The display device of claim 14, wherein the display device further comprises a light source arranged at a side where a light entering surface of the light guide plate is located.

16. The display device of claim 14, wherein the display device further comprises a counter substrate, wherein the counter substrate comprises a black matrix configured to define a plurality of sub-pixel regions, each of the plurality of sub-pixel regions comprises a light shielding region and opening regions arranged at both sides of the light shielding region, a light shielding pattern is arranged in the light shielding region, and the light shielding patterns are arranged at positions corresponding to the light extraction structures respectively.

17. The display device of claim 16, wherein an orthogonal projection of each light shielding pattern on the light extraction surface at least partially overlaps an orthogonal projection of the corresponding light extraction structure on the light extraction surface.

18. The display device of claim 14, wherein the display device further comprises: a light source, a counter substrate, and a liquid crystal layer arranged between the counter substrate and the optical substrate;

wherein the counter substrate comprises a base substrate and a black matrix arranged on the base substrate and configured to define a plurality of sub-pixel regions, each of the plurality of sub-pixel regions comprises a light shielding region and opening regions arranged at both sides of the light shielding region, and a light shielding pattern is arranged in the light shielding region;

wherein the optical substrate further comprises:

a first electrode arranged on the second planarization layer;

an insulating layer arranged on the first electrode; and a second electrode arranged on the insulating layer and configured to form an electric field together with the first electrode for driving the liquid crystal to deflect.

\* \* \* \* \*